US005361508A

United States Patent [19]

Ruggiero

[11] Patent Number: 5,361,508

[45] Date of Patent: Nov. 8, 1994

[54] TILE, ANGLE-CUTTING GAUGE

[76] Inventor: Joseph Ruggiero, 509 E. Broadway, Port Jefferson, N.Y. 11777

[21] Appl. No.: 113,075

[22] Filed: Aug. 30, 1993

[51] Int. Cl.[5] .................................... G01B 5/00

[52] U.S. Cl. .............................. 33/527; 33/454; 33/464; 33/427; 33/DIG. 20

[58] Field of Search ................ 33/526, 527, DIG. 20, 33/454, 464, 419, 427, 810

[56] References Cited

U.S. PATENT DOCUMENTS 366,404 7/1887 Klif .................................. 33/419
878,439 2/1908 Wagniere ...................... 33/810 X
3,371,423 3/1968 Paul ............................ 33/464 X
3,718,980 3/1973 Poulos ...................... 33/DIG. 20
4,393,600 7/1983 Coe .................................. 33/474
5,181,326 1/1993 Eberline .................. 33/DIG. 20

*Primary Examiner*—William A. Cuchlinski, Jr.
*Assistant Examiner*—Alvin Wirthlin
*Attorney, Agent, or Firm*—Bernard J. Murphy

[57] ABSTRACT

A body, having a straight-edged rule fixed thereto, and transverse thereto, slidably receives a pair of blocks which also have straight-edged rules fixed thereto. All the rules are parallel, and one thereof is used to engage a proximate wall surface, while the other two are adjustably set to take the measure across a last-laid tile. Then, the first, which engages the wall surface is fully retracted, while the adjustably-set other two rules are advanced, with the body, to the wall surface. The outermost rule, then, along its straight edge, defines whereat a next tile is to be cut to fit an undersized space.

11 Claims, 2 Drawing Sheets

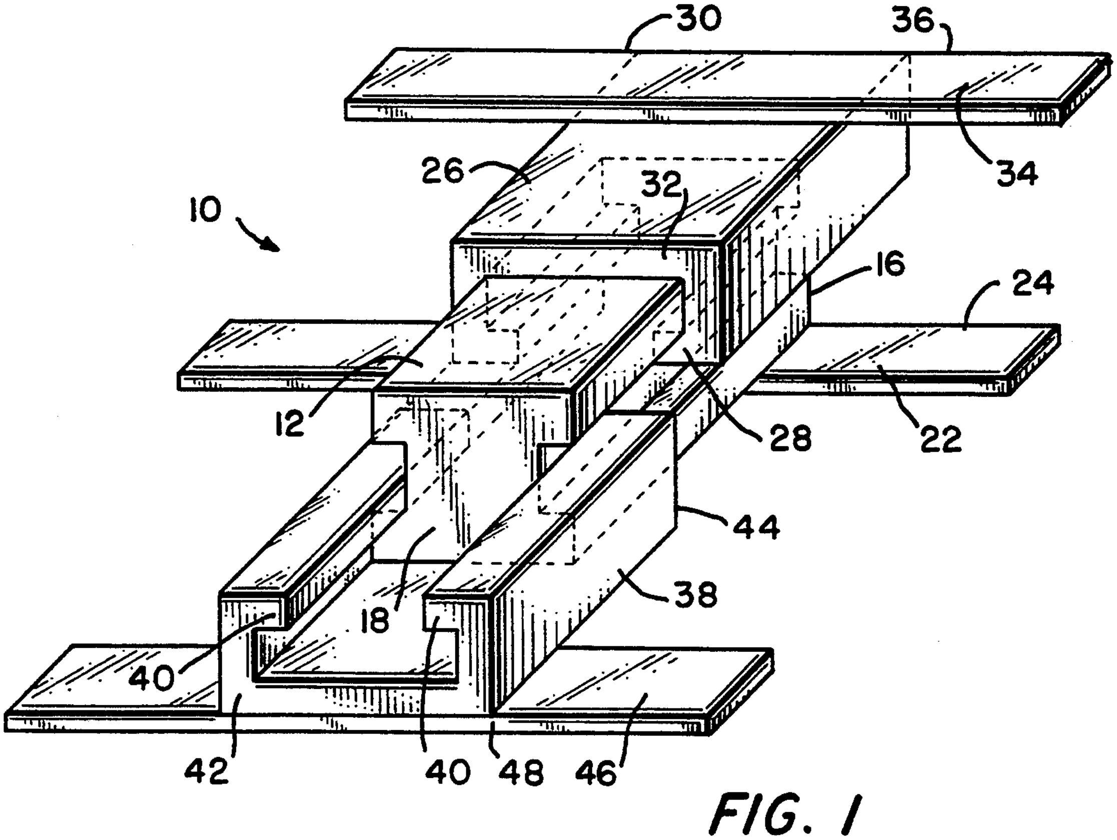
FIG. 1
FIG. 2
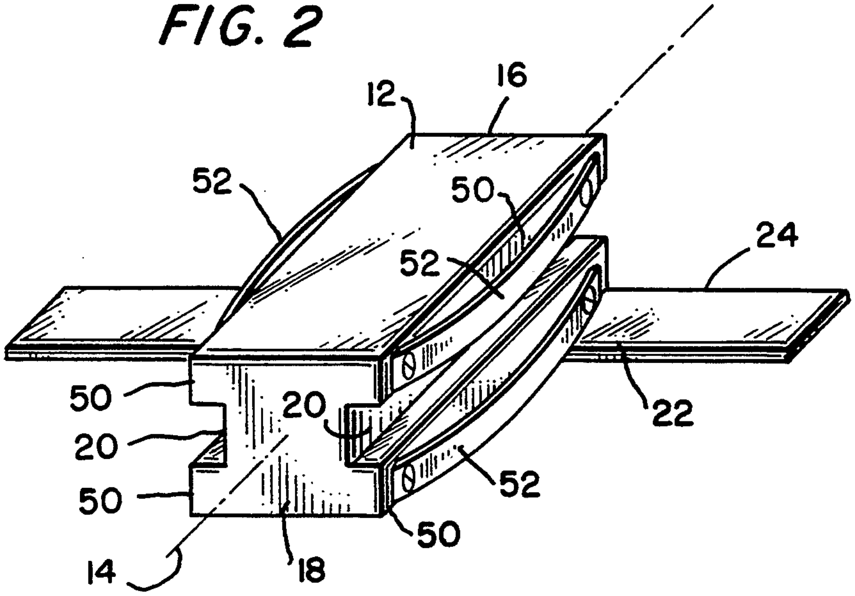

TILE, ANGLE-CUTTING GAUGE

This invention pertains to tile installation and cutting tools, and in particular to a novel tile, angle-cutting gauge.

The installation of tiles, on floors, walls or ceilings, can be very troublesome, as invariably the installer encounters angles and spaces which will not accommodate whole tiles and, accordingly, tiles must be cut to the proper angles and shapes to fit the odd spaces. This chore occasions the wastage of a goodly number of tiles, at some considerable expense, as trial and error tile-cutting produces cut tiles which are just a little too small, or are shaped with wrong angles, etc.

There has long been a need for a simple, albeit efficient, tile, angle-cutting gauge which is fool-proof, and faultlessly gauges the exactly correct angle and size for undersized tiles for fitting thereof in such aforesaid odd spaces.

It is an object of this invention, then, to set forth just such a long-needed, tile, angle-cutting gauge.

Specifically, it is an object of this invention to disclose a tile, angle-cutting gauge, comprising a body having a longitudinal axis; first means, slidably coupled to said body, having a straight-edged member extending perpendicular to said axis; second means, slidably coupled to said body, having a straight-edged member extending perpendicular to said axis; and wherein an end of said body comprises an abutment.

Further objects of this invention, as well as the novel features thereof, will become apparent by reference to the following description, taken in conjunction with the accompanying figures, in which:

FIG. 1 is a perspective illustration of the basic gauge, according to an embodiment of the invention, which omits the biasing means and the see-through aperture of one of the slide blocks;

FIG. 2 is a perspective view of the body, and herein the biasing means is shown in place thereon;

Figure 3:
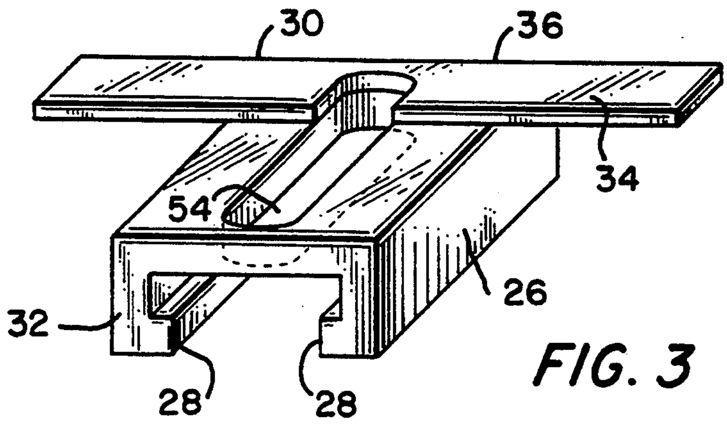
FIG. 3 is a perspective illustration of the uppermost slide block, and herein the see-through aperture therein is shown.

As shown in FIGS. 1 through 3, the novel gauge 10 comprises a body 12 having a longitudinal axis 14. The body 12 has a leading end 16 and a trailing end 18, and the leading end 16 comprises an abutment. The purpose of the abutment, constituted by end 16, is explained in the ensuing text. The body 12 has trackways 20 formed, axially, in sides thereof, and a straight-edged rule 22 is joined to the leading end 16. The straight-edge 24 of the rule 22 is flush with the leading end 16, and the rule 22 extends perpendicular to the axis 14.

A first slide block 26, having inwardly-extending rails 28, is slidably engaged with the body 12. The rails 28 engage the trackways 20. Block 26 has a leading end 30 and a trailing end 32, and mounts thereon, at the leading end 30 thereof, a straight-edged rule 34. The straight-edge 36 of the rule 34 is flush with the leading end 30 of the block 26.

A second slide block 38, also having inwardly-extending rails 40, is slidably engaged with the body 12 as well. Here too, the rails 40 engage the trackway 20. Block 38 has a leading end 42 and a trailing end 44, and mounts thereon, at the leading end 42 thereof, a straight-edged rule 46. The straight-edge 48 of the rule 46 is flush with the leading end 42 of block 38.

The same as rule 22 of body 12, the rules 34 and 46 of blocks 26 and 38, respectively, extend perpendicular to the axis 14.

As seen in FIG. 2, the body 12 has ribs 50, astride the trackways 20. Leaf springs 52 are coupled to the ribs 50 so that, as the slide blocks are moved axially of the body 12, (a) the movement thereof will be restrained, and (b) any final, slide-setting of the blocks 26 and 38 will be biasingly held thereat until forceably moved therefrom.

The FIG. 3 depiction of the first slide block 26 shows what was not illustrated in FIG. 1; here is shown the see-through aperture 54 which facilitates the use of the gauge 10.

Figure 4:
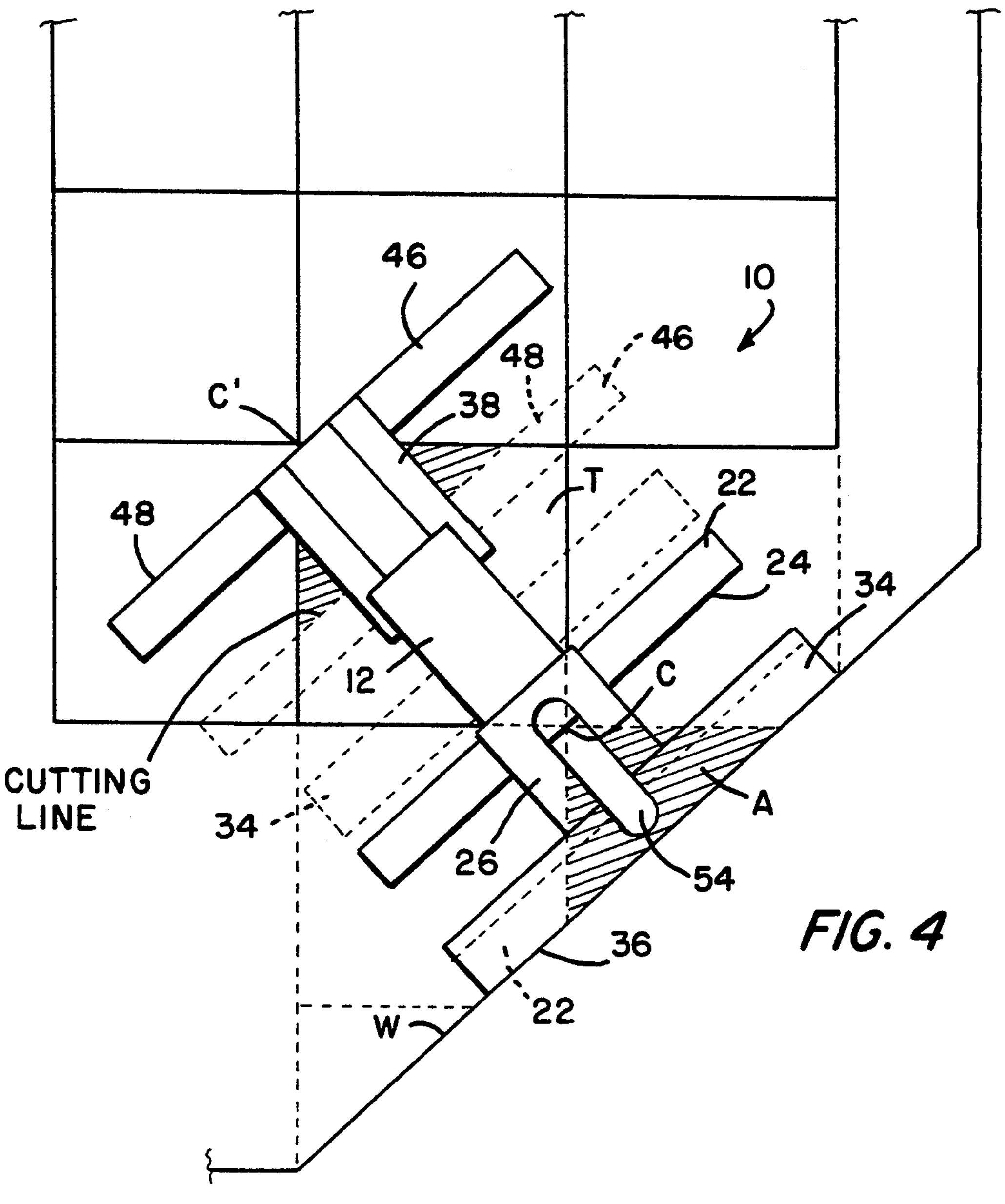
FIG. 4 shows the gauge in use toward the accurate gauging of a to-be-cut tile for fitting thereof in an undersized space.

FIG. 4 shows the gauge 10 in use, and represents therein an undersized space "A" into which a properly sized and angled tile has to be fitted. In order to ascertain how to cut a full tile, to fit the space "A", one does as follows. The first slide block 26 is slid outwardly, relative to the body 12 until it engages the wall surface "W" with its straight-edge 36 of the rule 34. The body 12 is moved, relative to slide block 26, until the straight-edge 24 of its rule 22 is exactly aligned with the corner "C" of the last-laid tile "T". Then, the slide block 38 is slid, relative to the body 12, until its straight edge 48 is exactly aligned with the opposite corner "C′" of the last-laid tile "T". Now, the first slide block 26 is fully retracted onto the body 12, and the gauge 10 is moved toward the wall surface "W" until the abutment-leading end 16 of the body 12 abuts the surface "W"—with the straight edge 24 flush with the surface "W". At this time, the straight edge 48 of the second slide block 38 is set to define a cutting line for a properly sized and angled tile. One has only to lift the gauge 10, set a tile upon the last-laid tile "T", in careful alignment therewith, set the now duly-measured gauge 10 back in place, with the edge 24 against the surface "W", and the gauge atop the new, to-be-cut tile, and draw a cutting line for the latter along the edge 48, on the to-be cut tile.

It is a relatively simple matter to align the straight edge 48 of block 38 with the corner "C′". However, alignment of straight edge 24 with the corner "C" could be a little troublesome, as the slide block 26 obscures the relevant portion of the straight edge 24. It is for this reason that the see-through aperture 54 is formed in the block 26. In FIG. 4, in phantom outline, the gauge is shown set to draw the tile-cutting line, whereas in full-line illustration the gauge 10 is shown with the tile corners "C" and "C′" aligned with the straight edges 24 and 48. As explained in the foregoing, it remains only to retract the slide block 26, and move the gauge 10 to the wall surface "W".

Clearly, in lieu of setting a to-be-cut tile upon the last-laid tile "T", and having to hold it securely thereon, the use of the gauge 10 can be used in this way. Rather than cementing the tile "T" in place, and then proceeding to determine a cut to be made on a next tile, the cut line for the next tile is made on the tile "T"; i.e., the latter not having been cemented in place. Then, tile "T" is cut, along the cut line, to serve as the next tile (for the undersized space). The cut tile is then set aside, a full tile is emplaced where tile "T" had been, and then the cut tile (formerly tile "T") is set into the undersized space.

The gauge 10 is usable with tiles of any geometric shape: square, round, rectangular, hexagonal, etc., and will accurately define the cut line for an undersized tile of the exactly correct angle.

While I have described my invention in connection with a specific embodiment thereof it is to be clearly understood that this is done only by way of example and not as a limitation to the scope of the invention as set forth in the objects thereof and in the appended claims. For instance, if deemed useful, the body 10 could carry rotary gears which mesh with rack-type gears carried by the first and second slide blocks 26 and 38, in lieu of use of leaf srings 52. Such an alternative embodiment of the invention, and all such alterations and variations which proceed from this disclosure, are deemed to be within the ambit of the invention, and embraced by the following claims.

I claim:

1. A tile, angle-cutting gauge, comprising:

a body having a longitudinal axis and a straight-edged member extending perpendicular to said axis;

a first slide block coupled to an upper portion of said body, and having a second straight-edged member extending perpendicular to said axis; and a second slide block coupled to a lower portion of said body, and having a third straight-edged member extending perpendicular to said axis; wherein said first slide block is slidably engaged with said body, and is (a) slidably extendable outwardly of said body at one axial end of said body, and (b) slidably outwardly of said body at the opposite axial end of said body, for disposition thereof in surmounting relationship with said second slide block;

said straight-edged member of said body defines an abutment; and said first slide block has an aperture formed therethrough to permit viewing of said abutment therethrough.

2. A tile, angle-cutting gauge, according to claim 1, wherein:

said body has a trackway formed therein; and said first and second slide blocks have means in engagement with said trackway.

3. A tile, angle-cutting gauge, according to claim 2, wherein:

said means in engagement comprise rails, interfitted with said trackway, for slidably guiding said first and second slide blocks lengthwise of said body.

4. A tile, angle-cutting gauge, according to claim 2, wherein:

said body has axially-extending ribs; and further including means mounted to said ribs for biasingly restraining slidable movement of said first and second slide blocks relative to said body.

5. A tile, angle-cutting gauge, according to claim 4, wherein:

said biasing means comprises leaf springs.

6. A tile, angle-cutting gauge, according to claim 1, wherein:

said members occupy parallel planes.

7. A tile-cutting gauge, according to claim 1, wherein:

all said members occupy parallel planes.

8. A tile, angle-cutting gauge, according to claim 1, wherein:

said second slide block is also slidably coupled to said body; and further including means interposed between said body and said first and second slide blocks for biasingly restraining slidable movement of said first and second slide blocks relative to said body.

9. A tile, angle-cutting gauge, according to claim 1, wherein:

said body has an upper and a lower surface;

said first slide block is slidably coupled to said upper surface and is spaced apart from said lower surface; and said second slide block is slidably coupled to said lower surface, and is spaced apart from said upper surface.

10. A tile, angle-cutting gauge, according to claim 1, wherein:

said first and second slide blocks each have leading and trailing ends; and said members are coupled to said leading ends of said first and second slide blocks.

11. A tile-cutting gauge, according to claim 1, wherein:

said body has leading and trailing ends; and said straight-edged member of said body is disposed at said leading end of said body.

* * * * *